US011663698B2

(12) United States Patent
Chih et al.

(10) Patent No.: US 11,663,698 B2
(45) Date of Patent: May 30, 2023

(54) SIGNAL PROCESSING METHOD FOR PERFORMING ITERATIVE BACK PROJECTION ON AN IMAGE AND SIGNAL PROCESSING DEVICE UTILIZING THE SAME

(71) Applicant: Realtek Semiconductor Corp., HsinChu (TW)

(72) Inventors: Chung-Yan Chih, HsinChu (TW); Wen-Tsung Huang, HsinChu (TW)

(73) Assignee: Realtek Semiconductor Corp., HsinChu (TW)

(*) Notice: Subject to any disclaimer, the term of this patent is extended or adjusted under 35 U.S.C. 154(b) by 90 days.

(21) Appl. No.: 17/118,465

(22) Filed: Dec. 10, 2020

(65) Prior Publication Data

US 2021/0192688 A1 Jun. 24, 2021

(30) Foreign Application Priority Data

Dec. 19, 2019 (TW) .................................. 108146605

(51) Int. Cl.
| | | |
|---|---|---|
| G06V 10/30 | (2022.01) | |
| G06V 30/164 | (2022.01) | |
| G06K 9/32 | (2006.01) | |
| G06T 3/40 | (2006.01) | |

(Continued)

(52) U.S. Cl.
CPC ............ G06T 3/4053 (2013.01); G06T 5/002 (2013.01); G06T 7/20 (2013.01)

(58) Field of Classification Search
None
See application file for complete search history.

(56) References Cited

U.S. PATENT DOCUMENTS

| | | | |
|---|---|---|---|
| 2015/0373235 A1 | 12/2015 | Chiang | |
| 2021/0174473 A1* | 6/2021 | Lung | G06T 3/0093 |
| 2021/0192688 A1* | 6/2021 | Chih | G06T 3/4053 |

FOREIGN PATENT DOCUMENTS

| | | |
|---|---|---|
| TW | 201828697 A | 8/2018 |
| TW | 201839715 A | 11/2018 |

OTHER PUBLICATIONS

Rasti et al.,"Iterative back projection based image resolution enhancement", 2013 8th Iranian Conference on Machine Vision and Image Processing (MVIP), 2013 (Year: 2013).*

(Continued)

*Primary Examiner* — Randolph I Chu
(74) *Attorney, Agent, or Firm* — Winston Hsu (57) ABSTRACT

A signal processing device includes a first frame buffer configured to store a first frame, a second frame buffer configured to store a second frame and a processor. The processor is coupled to the first frame buffer and the second frame buffer and is configured to perform a first image processing procedure according to the first frame and the second frame to obtain a super resolution difference value corresponding to each pixel of the first frame, perform a second image processing procedure according to the first frame and the second frame to obtain a noise reduction value corresponding to each pixel of the first frame, selectively add the super resolution difference value and the noise reduction value to the corresponding pixel of the first frame to generate an output frame and store the output frame in the second frame buffer as the second frame.

15 Claims, 5 Drawing Sheets

(51) Int. Cl.
*G06T 7/20* (2017.01)
*G06T 5/00* (2006.01)

(56) References Cited

OTHER PUBLICATIONS

Schtuwner, "3D-DNR", http://schtuwner.eu/en/world-schtuwner/technology-innovation/3d-noise-reduction/, 2011 (Year: 2011).*
Michal Irani and Shmule Peleg, "Improving resolution by image registration", pp. 231-239, vol. 53, No. 3, CVGIP: Graphical Models and Image Processing, Jun. 16, 1989.

* cited by examiner

SIGNAL PROCESSING METHOD FOR PERFORMING ITERATIVE BACK PROJECTION ON AN IMAGE AND SIGNAL PROCESSING DEVICE UTILIZING THE SAME

BACKGROUND OF THE INVENTION

1. Field of the Invention

The invention relates to a signal processing device, more particular to a signal processing device capable of utilizing the noise reduction information in the time domain and the space domain to perform iterative back projection on an image.

2. Description of the Prior Art

Super-resolution imaging is a technology for increasing image resolution. Super-resolution imaging can be applied in the field of generating an image with larger size, more pixels and better quality based on a low resolution image or in the field of enhancing the clearness of an image and sharpen the image based on the same resolution without changing the image size.

The existing super-resolution imaging technology uses deep learning to achieve a better result. However, the requirements of huge computation do not meet practical applications. In addition, while the super-resolution imaging technology enhances the details of an image, it also enhances the high-frequency noise, which is a side effect of performing super-resolution imaging operations.

To solve this problem, a signal processing device which is capable of saving the hardware or software storage cost and enhancing the details of an image while reducing the high-frequency noise at the same time when performing super-resolution imaging operations is highly required.

SUMMARY OF THE INVENTION

An objective of the invention is to provide a signal processing method and associated signal processing device, which are capable of saving the hardware or software storage cost and enhancing the details of an image while reducing the high-frequency noise at the same time when performing super-resolution imaging operations.

At least one embodiment of the invention provides a signal processing device includes a first frame buffer configured to store a first frame, a second frame buffer configured to store a second frame and a processor. The processor is coupled to the first frame buffer and the second frame buffer and is configured to perform a first image processing procedure according to the first frame and the second frame to obtain a super resolution difference value corresponding to each pixel of the first frame, perform a second image processing procedure according to the first frame and the second frame to obtain a noise reduction value corresponding to each pixel of the first frame, selectively add the super resolution difference value and the noise reduction value to the corresponding pixel of the first frame to generate an output frame and store the output frame in the second frame buffer as the second frame.

At least another embodiment of the invention provides a signal processing method for a signal processing device comprising a first frame buffer configured to store a first frame, a second frame buffer configured to store a second frame and a processor. The method is performed by the processor and comprises: performing a first image processing procedure according to the first frame and the second frame to obtain a super resolution difference value corresponding to each pixel of the first frame; performing a second image processing procedure according to the first frame and the second frame to obtain a noise reduction value corresponding to each pixel of the first frame; selectively adding the super resolution difference value and the noise reduction value to the corresponding pixel of the first frame to generate an output frame; and storing the output frame in the second frame buffer as the second frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
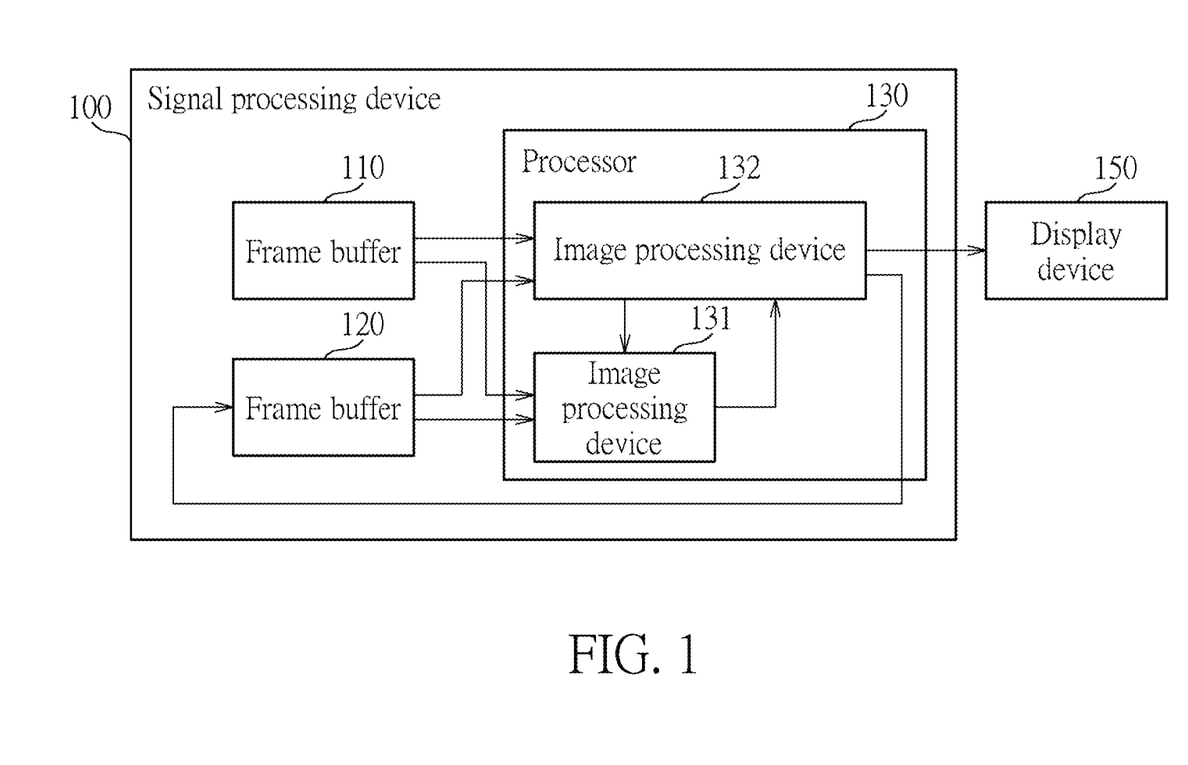
FIG. 1 is an exemplary block diagram of a signal processing device according to an embodiment of the invention.

FIG. 1 is an exemplary block diagram of a signal processing device according to an embodiment of the invention. The signal processing device 100 may at least comprise frame buffers 110 and 120 and a processor 130. The frame buffer 110 is configured to store a first frame, for example, a current frame. Here, the "current frame" may refer to the frame that is currently being processed by the processor 130. The frame buffer 120 is configured to store a second frame, for example, a previous frame. The frame buffer 110 may receive the first frame from an image source. As an example, the frame buffer 110 may receive the first frame via a host (not shown). In an embodiment of the invention, the processor 130 is implemented by a hardware circuit.

The processor 130 is coupled to the frame buffers 110 and 120 and configured to perform a first image processing procedure according to the first frame and the second frame to obtain a first estimation value and perform a second image processing procedure according to the first frame and the second frame to obtain a second estimation value. According to an embodiment of the invention, the first image processing procedure may be an Iterative Back Projection (IBP) procedure. The processor 130 may perform the IBP procedure according to the first frame and the second frame to estimate and obtain a super resolution difference value corresponding to each pixel of the first frame. In addition, according to an embodiment of the invention, the second image processing procedure may be a three-dimensional noise reduction (3DNR) procedure. The processor 130 may perform the 3DNR procedure according to the first frame and the second frame to estimate and obtain a noise reduction value corresponding to each pixel of the first frame.

According to an embodiment of the invention, the processor 130 may selectively add the super resolution difference value and the noise reduction value to the first frame to generate an output frame. The output frame may be provided to a signal processing device (when there is) in the following stage or another processing circuit (when there is) comprised in the processor 130 for some follow-up signal processing, or may be provided to the display device 150 to be displayed. In addition, the output frame may also be stored in the frame buffer 120 as the second frame (that is, the previous frame). In other words, the second frame previously stored in the frame buffer 120 is replaced by the newly stored one. When the processor 130 has finished the image processing on the current frame, the processor 130 may also receive a next frame from the image source (not shown) and store it in the frame buffer 110. That is, the processor 130 may store the current frame that has been processed (that is, the aforementioned output frame) back to the frame buffer 120 as a previous frame of the next frame, so as to implement an iterative image processing procedure.

The processor 130 may comprise image processing devices 131 and 132. The image processing device 131 is configured to perform the first image processing procedure, such as the aforementioned IBP procedure. The image processing device 132 is configured to perform the second image processing procedure, such as the aforementioned 3DNR procedure. The image processing devices 131 and 132 may be a portion of the circuits comprised in the processor 130. According to an embodiment of the invention, the image processing devices 131 and 132 may perform the corresponding image processing procedure in parallel on the frame data of the first frame (the current frame) stored in the frame buffer 110 according to the frame data stored in the frame buffers 110 and 120 and generate the output frame. Therefore, in the embodiments of the invention, the image processing devices 131 and 132 share the data stored in the frame buffers 110 and 120. The image processing devices 131 and 132 may perform the corresponding image processing procedure at the same time according to the data stored in the frame buffers 110 and 120 and respectively and selectively add the obtained estimation value back to the current frame to generate the output frame. Therefore, the output frame is a result of the current frame enhanced by the IBP and 3DNR procedures.

It should be noted that in other embodiments of the invention, the image processing devices 131 and 132 may also be integrated as one image processing device. Therefore, the invention should not be limited to the structure shown in FIG. 1.

Figure 2:
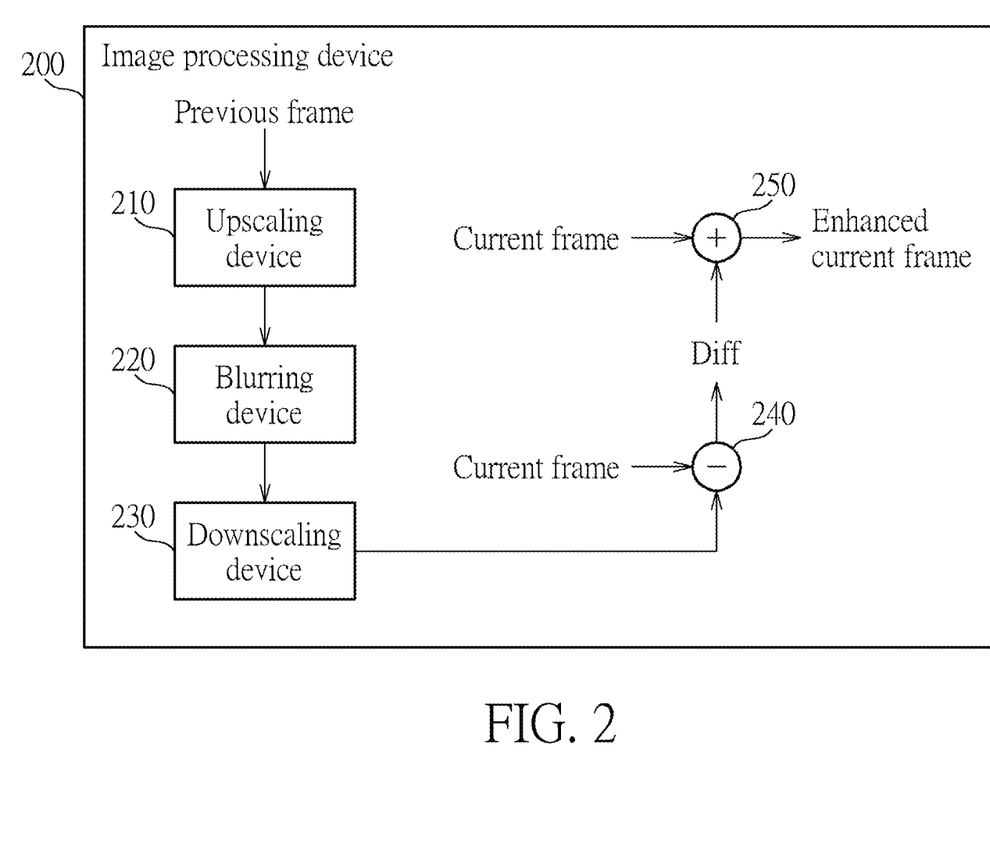
FIG. 2 is an exemplary block diagram of an image processing device according to an embodiment of the invention.

FIG. 2 is an exemplary block diagram of an image processing device according to an embodiment of the invention. The image processing device 200 may be configured to perform the IBP procedure. As discussed above, the image processing device 200 may be the image processing device 131 shown in FIG. 1, or may be integrated into the image processing device 132, or may be directly viewed as a portion of the circuits comprised in the processor 130.

First of all, the image processing device 200 obtain the frame data of the previous frame and the current frame from the frame buffers.

Next, an upscaling device 210 is configured to enlarge the previous frame to generate an enlarged image. That is, the size of the image is enlarged, or the resolution is increased. For example, the upscaling device 210 may enlarge the size of the previous frame by two times. The upscaling device 210 may be implemented by a linear interpolator, a high-pass filter or a low-pass filter.

Nest, a blurring device 220 is configured to blur the enlarged image according to a blur function to generate a blurred image. The blurring operation may estimate the loss of sharpness when projecting from high resolution to low resolution, while avoiding aliasing effect when reducing the resolution. The blurring device 220 may be implemented by a low-pass filter, and the size of the low-pass filter may be flexibly selected according to cost requirements.

Next, the downscaling device 230 is configured to reduce or scale down the blurred image to generate a reduced image. That is, the size of the image is reduced, or the resolution is decreased. The downscaling operation may obtain an estimated low resolution image, and the resolution of the reduced image generated by the downscaling device 230 is the same as the current frame. The downscaling device 230 may be implemented by a high-pass filter or a low-pass filter, and the size of the filter may be flexibly selected according to cost requirements.

Next, the subtractor 240 is configured to subtract the output of the downscaling device 230 from the current frame to obtain the super resolution difference value (the super resolution difference value Diff shown in FIG. 2).

According to an embodiment of the invention, the image processing device 200 (or, the processor 130) may selectively provide the super resolution difference value Diff to the adder 250. The adder 250 may be configured to add the super resolution difference value Diff (or, in other embodiments, the noise reduction value may also be included) to the current frame to obtain an enhanced current frame. The purpose of selectively adding the super resolution difference value Diff to the current frame is to avoid distortion generated when adding the super resolution difference value Diff to the current frame, so as to ensure the image quality of the output frame.

It should be noted that although the current frame/previous frame are utilized for illustration, in practice, the data of the current frame/previous frame shown in FIG. 2 may be obtained by selecting a pixel from the current frame/previous frame as a current pixel (that is, the pixel currently being processed) and obtaining the pixel value of the current pixel in the current frame/previous frame or obtaining the pixel values of the current pixel and one or more adjacent pixels of the current pixel in the current frame/previous frame as the data of the current frame/previous frame.

To be more specific, the image processing device 200 may apply a sliding window centered on the current pixel in the current frame/previous frame and take the image data of an image block with a predetermined size (for example, a 5*5 pixel block) as the data of the current frame/previous frame. After processing the data of the image block through the image processing procedure shown in FIG. 2, an enhanced image block is obtained. Finally, the pixel value corresponding to the current pixel in the enhanced image block is the pixel value of the current pixel in the output frame.

Figure 3:
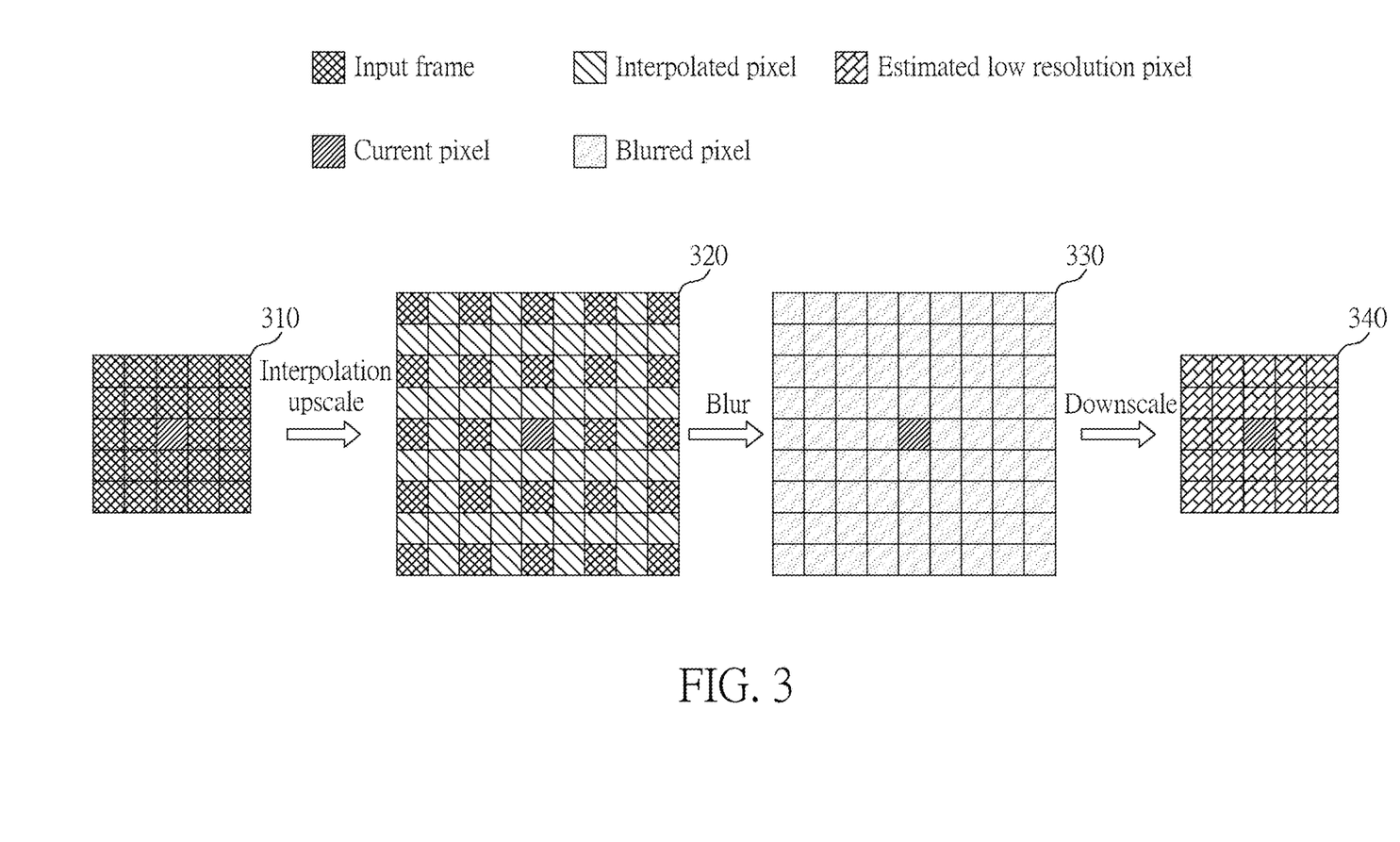
FIG. 3 is a schematic diagram showing the procedure of upscaling, blurring and downscaling an image according to an embodiment of the invention.

FIG. 3 is a schematic diagram showing the procedure of upscaling, blurring and downscaling an image according to an embodiment of the invention. As shown in FIG. 3, the input frame 310 may be the aforementioned previous frame, which is obtained by taking image data of an image block centered on the current pixel with a predetermined size. After upscaling the input frame by interpolation, an enlarged image 320 is obtained. Besides the pixels originally comprised in the input frame, the enlarged image 320 also comprises the interpolated pixel obtained by performing linear interpolation. After blurring the enlarged image 320, a blurred image 330, in which every pixel has been blurred, is obtained. The blurred image 330 is finally reduced as an estimated low regulation image 340 having an image size that is the same as the image size of the input frame.

Figure 4:
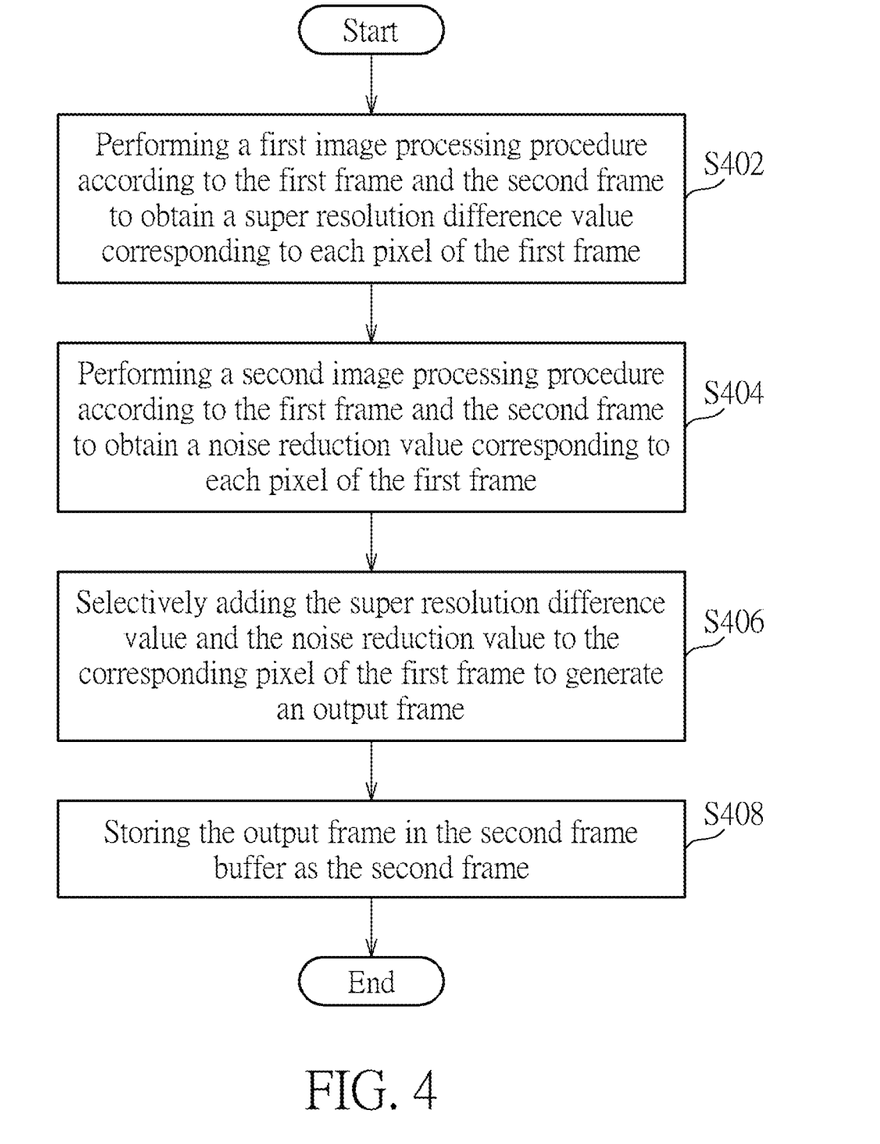
FIG. 4 is a flow chart of a signal processing method according to an embodiment of the invention.

FIG. 4 is a flow chart of a signal processing method according to an embodiment of the invention. The signal processing method may be applied in the signal processing device shown in FIG. 1 and performed by the processor 130. The method performed by the processor 130 may comprise the following steps:

S402: Performing a first image processing procedure according to the first frame and the second frame to obtain a super resolution difference value corresponding to each pixel of the first frame.

S404: Performing a second image processing procedure according to the first frame and the second frame to obtain a noise reduction value corresponding to each pixel of the first frame.

S406: Selectively adding the super resolution difference value and the noise reduction value to the corresponding pixel of the first frame to generate an output frame.

S408: Storing the output frame in the second frame buffer as the second frame.

It should be noted that the sequence of performing steps S402 and S404 is not a limit of the invention. As long as the processor 130 finally stores the output frame that has been processed by step S402 and S404 back to the frame buffer as the previous frame of a next frame, the invention is not limited to any arrangement of performing steps S402 and S404. For example, step S404 may be performed before or after step S402, or, steps S402 and S404 may be performed in parallel at the same time, or, the detailed operations in steps S402 and S404 may be performed in an interleaved manner.

In addition, in step S406, the processor 130 (or, the corresponding image processing device, for example, a processing circuit) may conditionally add the super resolution difference value and the noise reduction value back to the corresponding pixel, so as to ensure the image quality.

According to an embodiment of the invention, in step S404, the processor 130 may perform motion estimation on the current frame to determine which image blocks in the current frame are motion blocks and determine whether to add the super resolution difference value and the noise reduction value in step S406 according to the information regarding the motion blocks. For the details of the motion estimation, reference may be made to the U.S. publication number U.S. 20150373235A1.

To be more specific, after determining which image blocks in the current frame are motion blocks, the processor 130 may set a motion flag value for the central pixel of each image block. The motion flag value corresponding to a pixel is configured to indicate whether the pixel or the corresponding image block is a motion pixel or a motion image block. Therefore, when determining whether to add the super resolution difference value and the noise reduction value, the processor 130 may obtain the motion flag value corresponding to the current pixel and determine whether the current pixel is a motion pixel.

When the motion flag value corresponding to the current pixel indicates that the current pixel is a motion pixel, the processor 130 may be configured or may determine not to add the super resolution difference value corresponding to the current pixel to the current pixel (that is, not to add the super resolution difference value to the pixel value of the current pixel), or the processor may be configured to decrease or reduce the super resolution difference value corresponding to the current pixel to obtain a decreased or reduced super resolution difference value (for example, having 50% reduction) and add the decreased or reduced super resolution difference value to the current pixel (that is, add the decreased or reduced super resolution difference value to the pixel value of the current pixel), so as to avoid the aliasing effect (that is, motion-noise enhancement at motion region). When the motion flag value corresponding to the current pixel indicates that the current pixel is not a motion pixel, the processor 130 may be configured or may determine to directly add the super resolution difference value corresponding to the current pixel to the current pixel.

Similarly, when the motion flag value corresponding to the current pixel indicates that the current pixel is a motion pixel, the processor 130 may be configured or may determine not to add the noise reduction value corresponding to the current pixel to the current pixel, or the processor 130 may be configured to decrease or reduce the noise reduction value corresponding to the current pixel to obtain a decreased or reduced noise reduction value and add the decreased or reduced noise reduction value to the current pixel. When the motion flag value corresponding to the current pixel indicates that the current pixel is not a motion pixel, the processor 130 may be configured or may determine to directly add the noise reduction value corresponding to the current pixel to the current pixel.

According to another embodiment of the invention, in step S406, the processor 130 may be configured to determine a maximum value and a minimum value among the current pixel and one or more pixels adjacent to the current pixel, and determine whether to add the super resolution difference value in step S406 according to this information To be more specific, the processor 130 may determine whether a difference between the maximum value and the minimum value is greater than a high threshold value or lower than a low threshold value. When the difference is higher than the high threshold value or is lower than the low threshold value, it means that the current pixel is in a distinct edge area or in a flat area. In this manner, the processor 130 may be configured or may determine not to add the super resolution difference value corresponding to the current pixel to the current pixel, or may decrease or reduce the super resolution difference value corresponding to the current pixel to obtain a decreased or reduced super resolution difference value and add the decreased or reduced super resolution difference value to the current pixel. When the difference is between the high threshold value and the low threshold value, the processor 130 may be configured or may determine to add the super resolution difference value corresponding to the current pixel to the current pixel.

Or, the processor 130 may determine a high threshold value and a low threshold value according to the maximum value and the minimum value. For example, the processor 130 may directly take the maximum value as the high threshold value and take the minimum value as the low threshold value or may add a predetermined value to the maximum value and the minimum value to obtain the high threshold value and the low threshold value. The processor 130 may determine whether an enhanced pixel value obtained by adding the super resolution difference value corresponding to the current pixel to the current pixel is greater than the high threshold value or lower than the low threshold value. When the enhanced pixel value is higher than the high threshold value or lower than the low threshold value, the processor 130 may determine not to add the super resolution difference value corresponding to the current pixel to the current pixel, or the processor 130 may be configured to decrease or reduce the noise reduction value corresponding to the current pixel to obtain a decreased or reduced noise reduction value and add the decreased or reduced noise reduction value to the current pixel. When the enhanced pixel value is between the high threshold value and the low threshold value, the processor 130 may add the super resolution difference value corresponding to the current pixel to the current pixel.

Figure 5:
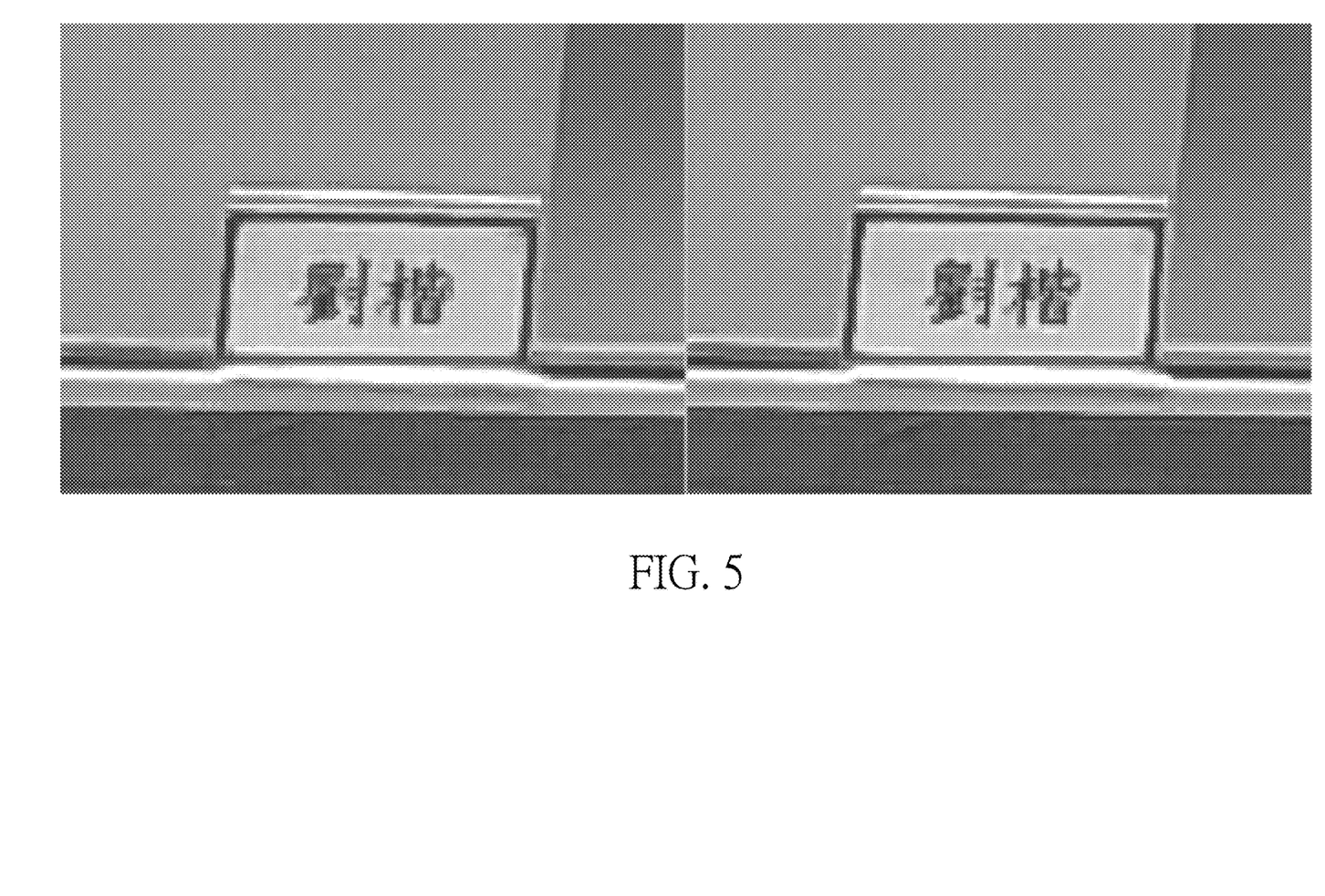
FIG. 5 shows two images for comparison.

FIG. 5 shows two images for comparison. The image on the left side is an original image and the image on the right side is an image obtained after performing the 3DNR and IBP procedures according to an embodiment of the invention. As shown in FIG. 5, after performing the 3DNR and IBP procedures, the image is clearer and the details are sharper.

In summary, in the signal processing flow of the invention, the IBP procedure is performed using the time domain and space domain noise reduction information (that is, the output frame after being processed by the 3DNR procedure) to implement super-resolution enhancement for continuous images. Compared with the conventional super-resolution imaging technology, the resulting enhanced image has less noise, which is a significant improvement.

In addition, since the image processing devices 131 and 132 share the data stored in the frame buffers 110 and 120, the iterative operation in the IBP procedure is achieved, and the hardware or software storage cost can be greatly reduced. In addition, because not only the IBP procedure, but also the 3DNR procedure has been performed on the current frame, the visual effects of both enhanced details and reduced jitter noise can be achieved at the same time and are presented in the output super-resolution images.

In addition, in the proposed signal processing method, for the motion blocks, the method may determine not to add the super resolution difference value and/or the noise reduction value back or may add a decreased or reduced super resolution difference value and/or a decreased or reduced noise reduction value, so as to maintain appropriate blurring effect. In this manner, excessive distortion of the output super-resolution image can be avoided and good image quality can be maintained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing device, comprising:
a first frame buffer, configured to store a first frame;
a second frame buffer, configured to store a second frame; and
a processor, coupled to the first frame buffer and the second frame buffer and configured to perform a first image processing procedure according to the first frame and the second frame to obtain a super resolution difference value corresponding to each pixel of the first frame, perform a second image processing procedure according to the first frame and the second frame to obtain a noise reduction value corresponding to each pixel of the first frame, selectively add the super resolution difference value and the noise reduction value to the corresponding pixel of the first frame to generate an output frame and store the output frame in the second frame buffer as the second frame, wherein the processor is further configured to obtain a motion flag value corresponding to a current pixel of the first frame, the motion flag value indicates whether the current pixel is a motion pixel, the processor is configured to determine whether to add the super resolution difference value and/or the noise reduction value corresponding to the current pixel to the current pixel according to the motion flag value corresponding to the current pixel.

2. The signal processing device of claim 1, wherein the processor comprises:
a first image processing device, configured to perform the first image processing procedure; and
a second image processing device, configured to perform the second image processing procedure,
wherein the first image processing device and the second image processing device share the first frame buffer and the second frame buffer.

3. The signal processing device of claim 1, wherein an image resolution of the first frame is the same as an image resolution of the second frame.

4. The signal processing device of claim 1, wherein the first image processing procedure is an iterative back projection procedure, and the second image processing procedure is a three-dimensional noise reduction procedure.

5. The signal processing device of claim 1, wherein when the motion flag value corresponding to the current pixel indicates that the current pixel is a motion pixel, the processor is configured not to add the super resolution difference value corresponding to the current pixel to the current pixel.

6. The signal processing device of claim 1, wherein when the motion flag value corresponding to the current pixel indicates that the current pixel is a motion pixel, the processor is configured to decrease the super resolution difference value corresponding to the current pixel to obtain a decreased super resolution difference value and add the decreased super resolution difference value to the current pixel.

7. The signal processing device of claim 1, wherein when the motion flag value corresponding to the current pixel indicates that the current pixel is a motion pixel, the processor is configured not to add the noise reduction value corresponding to the current pixel to the current pixel.

8. A signal processing device, comprising:
a first frame buffer, configured to store a first frame;
a second frame buffer, configured to store a second frame; and
a processor, coupled to the first frame buffer and the second frame buffer and configured to perform a first image processing procedure according to the first frame and the second frame to obtain a super resolution difference value corresponding to each pixel of the first frame, perform a second image processing procedure according to the first frame and the second frame to obtain a noise reduction value corresponding to each pixel of the first frame, selectively add the super resolution difference value and the noise reduction value to the corresponding pixel of the first frame to generate an output frame and store the output frame in the second frame buffer as the second frame, wherein the processor is configured to determine whether to add the super resolution difference value corresponding to a current pixel to the current pixel according to the current pixel and one or more pixels adjacent to the current pixel.

9. The signal processing device of claim 8, wherein the processor is further configured to determine a maximum value and a minimum value among the current pixel and the one or more pixels adjacent to the current pixel, and determine whether a difference between the maximum value and the minimum value is greater than a high threshold value or lower than a low threshold value, and when the difference is higher than the high threshold value or lower than the low threshold value, the processor is configured not to add the super resolution difference value corresponding to the current pixel to the current pixel.

10. The signal processing device of claim 8, wherein the processor is further configured to determine a maximum value and a minimum value among the current pixel and the one or more pixels adjacent to the current pixel, determine a high threshold value and a low threshold value according to the maximum value and the minimum value, and determine whether an enhanced pixel value obtained by adding the super resolution difference value corresponding to the current pixel to the current pixel is greater than the high threshold value or lower than the low threshold value, and when the enhanced pixel value is higher than the high threshold value or lower than the low threshold value, the processor is configured not to add the super resolution difference value corresponding to the current pixel to the current pixel.

11. A signal processing method, for a signal processing device comprising a first frame buffer configured to store a first frame, a second frame buffer configured to store a second frame, the method comprising:
performing a first image processing procedure according to the first frame and the second frame to obtain a super resolution difference value corresponding to each pixel of the first frame;
performing a second image processing procedure according to the first frame and the second frame to obtain a noise reduction value corresponding to each pixel of the first frame;
selectively adding the super resolution difference value and the noise reduction value to the corresponding pixel of the first frame to generate an output frame; and
storing the output frame in the second frame buffer as the second frame, wherein the step of selectively adding the super resolution difference value and the noise reduction value to the corresponding pixel of the first frame to generate the output frame further comprises:
determining whether to add the super resolution difference value corresponding to a current pixel to the current pixel according to the current pixel and one or more pixels adjacent to the current pixel.

12. The signal processing method of claim 11, wherein an image resolution of the first frame is the same as an image resolution of the second frame.

13. The signal processing method of claim 11, wherein the first image processing procedure is an iterative back projection procedure, and the second image processing procedure is a three-dimensional noise reduction procedure.

14. The signal processing method of claim 11, wherein the step of determining whether to add the super resolution difference value corresponding to the current pixel to the current pixel according to the current pixel and one or more pixels adjacent to the current pixel further comprises:
determining a maximum value and a minimum value among the current pixel and the one or more pixels adjacent to the current pixel;
determining whether a difference between the maximum value and the minimum value is greater than a high threshold value or lower than a low threshold value; and
when the difference is higher than the high threshold value or lower than the low threshold value, not adding the super resolution difference value corresponding to the current pixel to the current pixel.

15. The signal processing method of claim 11, wherein the step of determining whether to add the super resolution difference value corresponding to the current pixel to the current pixel according to the current pixel and one or more pixels adjacent to the current pixel further comprises:
determining a maximum value and a minimum value among the current pixel and the one or more pixels adjacent to the current pixel;
determining a high threshold value and a low threshold value according to the maximum value and the minimum value;
determining whether an enhanced pixel value obtained by adding the super resolution difference value corresponding to the current pixel to the current pixel is greater than the high threshold value or lower than the low threshold value; and
when the enhanced pixel value is higher than the high threshold value or lower than the low threshold value, not adding the super resolution difference value corresponding to the current pixel to the current pixel.

* * * * *